Jan. 20, 1959 J. D. TURNER 2,869,788

LUMBER TALLY SYSTEM

Filed June 17, 1957 4 Sheets-Sheet 1

INVENTOR.

John D. Turner

BY

[signature]

Atty.

Jan. 20, 1959 J. D. TURNER 2,869,788

LUMBER TALLY SYSTEM

Filed June 17, 1957 4 Sheets-Sheet 2

INVENTOR.
John D. Turner
BY
Greek Wells
Atty.

INVENTOR.
John D. Turner
BY
[signature]
Atty.

Jan. 20, 1959 J. D. TURNER 2,869,788

LUMBER TALLY SYSTEM

Filed June 17, 1957 4 Sheets-Sheet 4

INVENTOR.

John D. Turner

BY

Atty.

United States Patent Office 2,869,788 Patented Jan. 20, 1959

2,869,788

LUMBER TALLY SYSTEM

John D. Turner, Deer Park, Wash.

Application June 17, 1957, Serial No. 666,099

10 Claims. (Cl. 235—61)

The present invention relates to a tally system for counting board feet of lumber. Today it is most imperative for a sawmill operator to know the amount of board feet of lumber actually processed at frequent intervals of time. It is the purpose of this invention to provide a tally system which will count the board feet in boards of lumber passing it, despite variations in length, width and thickness of the boards, and maintain a continuous count thereof which is available at any time. Although my invention is not limited thereto, it is readily applicable to the flow of green lumber through the trim saws where the ends of the rough boards are trimmed square and bad sections of boards are cut out, leaving boards of shorter length.

More specifically it is a purpose of my invention to provide a lumber tally system wherein the moving boards are presented to a first board dimension detecting device which closes certain points in an electrical circuit forming part of the system, which circuit when completed, operates to create electrical impulses indicative of this board dimension detected, then the boards are presented to a second board dimension detecting device which closes certain other points in an electrical circuit forming part of the system, which circuit when completed, operates to allocate the first impulses in a manner indicative of the second dimension of the same board and, finally, the boards are presented to a third board dimension detecting device which closes certain other points in an electrical circuit forming part of the system, which circuit when completed, operates to complete a circuit to multiply and transmit the impulses in response to indications of the third dimension of the same board. For example, the first dimension to be detected may be the length, the second dimension may be the thickness and the third dimension detected may be the width. This would be the choice when the boards are moved by a conveyor on which they extend transversely and lie flat so that the width is in the direction of movement of the conveyor. If the boards were moved on edge, that is, with their width dimension perpendicular to their plane of movement, then either the width dimension or the length dimension could be used as the impulse number determination dimension and the other one could be used as the allocation determination dimension. The thickness dimension would then be in the direction of movement of the boards and it would complete the circuit and be the final computing dimension. If the boards are moved lengthwise, then the board length dimension could be the final impulse computing dimension.

My invention is applicable to a lumber handling system wherein one dimension is detected by a mechanical device such as the trim saw unit of a sawmill which cuts the boards to definite lengths after they have been cut to definite width and thickness. It is also applicable to a system wherein all of the detecting devices operate after the dimensions have all been cut.

The nature and advantages of the invention will appear more fully from the following description and the accompanying drawings describing and illustrating a preferred embodiment of the invention. The description and drawings are illustrative only, however, and are not intended to limit the scope of the invention except insofar as it is limited by the claims.

My invention depends upon counting a number of theoretical pieces of lumber which are of such dimension that any board to be measured can be divided into a number of such pieces without having any fraction of a piece left over. For example, boards generally are sawed in two foot increments of length, in one inch increments of width and in quarter inch increments of thickness. Therefore, if we take a theoretical piece of lumber two feet long, one inch wide and one-fourth inch thick, any board sawed in the increments stated above may be divided evenly into a number of such pieces without any fraction of a piece left over. Twenty four such pieces would make a board foot of lumber since each such piece would contain six cubic inches and a board foot of lumber is 144 cubic inches.

Figure 1:
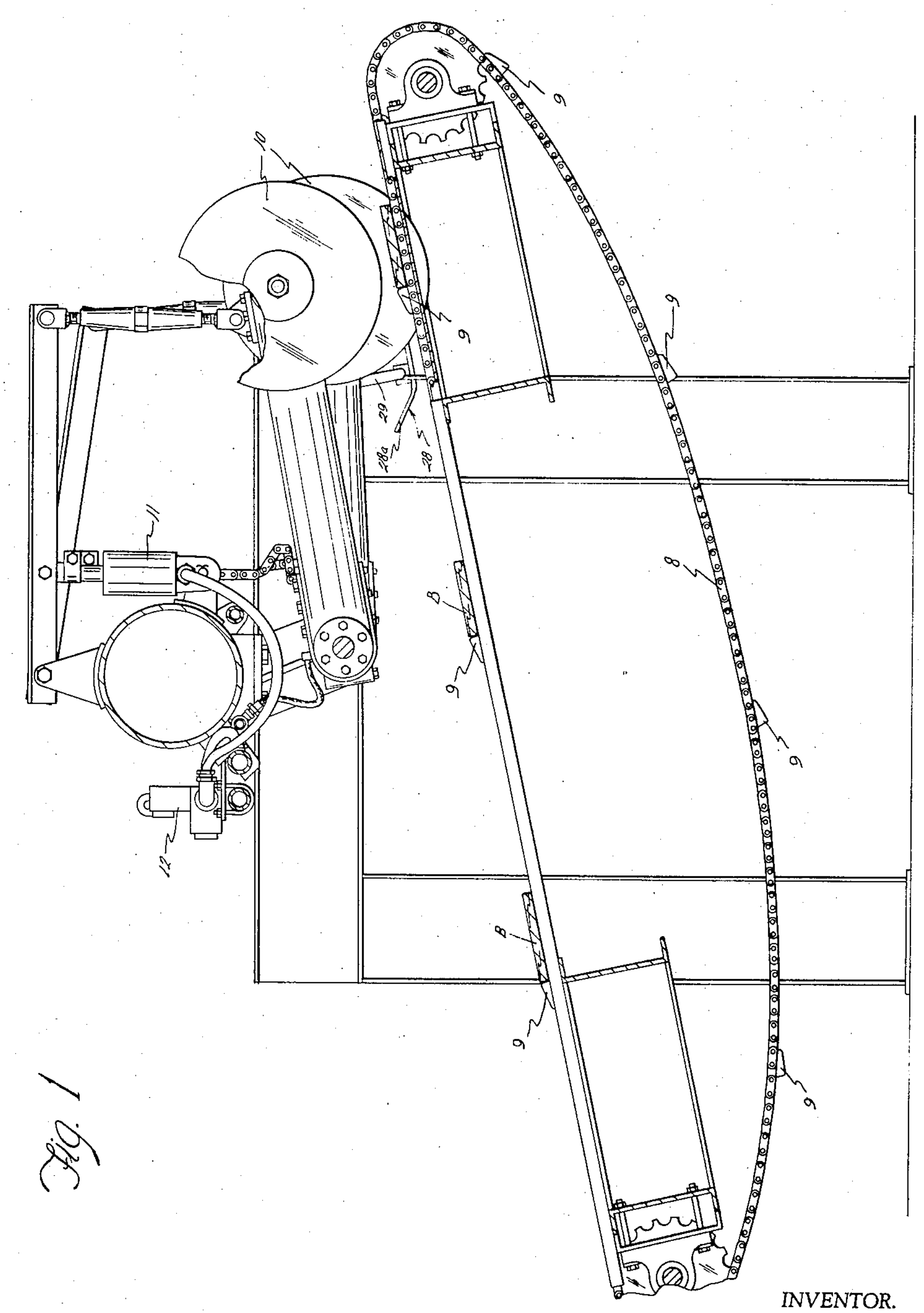
Figure 1 is a sectional view through a trim saw unit to which my invention is applicable, showing how boards are carried past trim saws that are raised and lowered to cut the boards to desired length and indicating how my invention may utilize the trim saw mechanism to detect board length.

The length of a board is determined usually at the trim saws in a sawmill. As illustrated in Figure 1, these saws are arranged so as to cut a board by engaging it with a saw or saws selected by the trim saw operator. One saw 10 is shown lowered to cut the board B while another saw 10 is raised to permit a board to pass beneath it. Trim saws are arranged and operated in many different ways. The showing herein is merely an example of one arrangement and is not intended to limit the invention. In practice the boards B are laid on a conveyor 8 having lugs 9 that engage the boards and move them up beneath the trim saws 10. In machines of the type shown there is a saw every two feet all the way across the conveyor with a saw at each side of the conveyor. Thus a set of trim saws adapted to handle boards up to 20 feet long would have eleven saws including the end saws. These eleven saws are shown diagrammatically in Figure 2 of the drawings.

Figure 2:
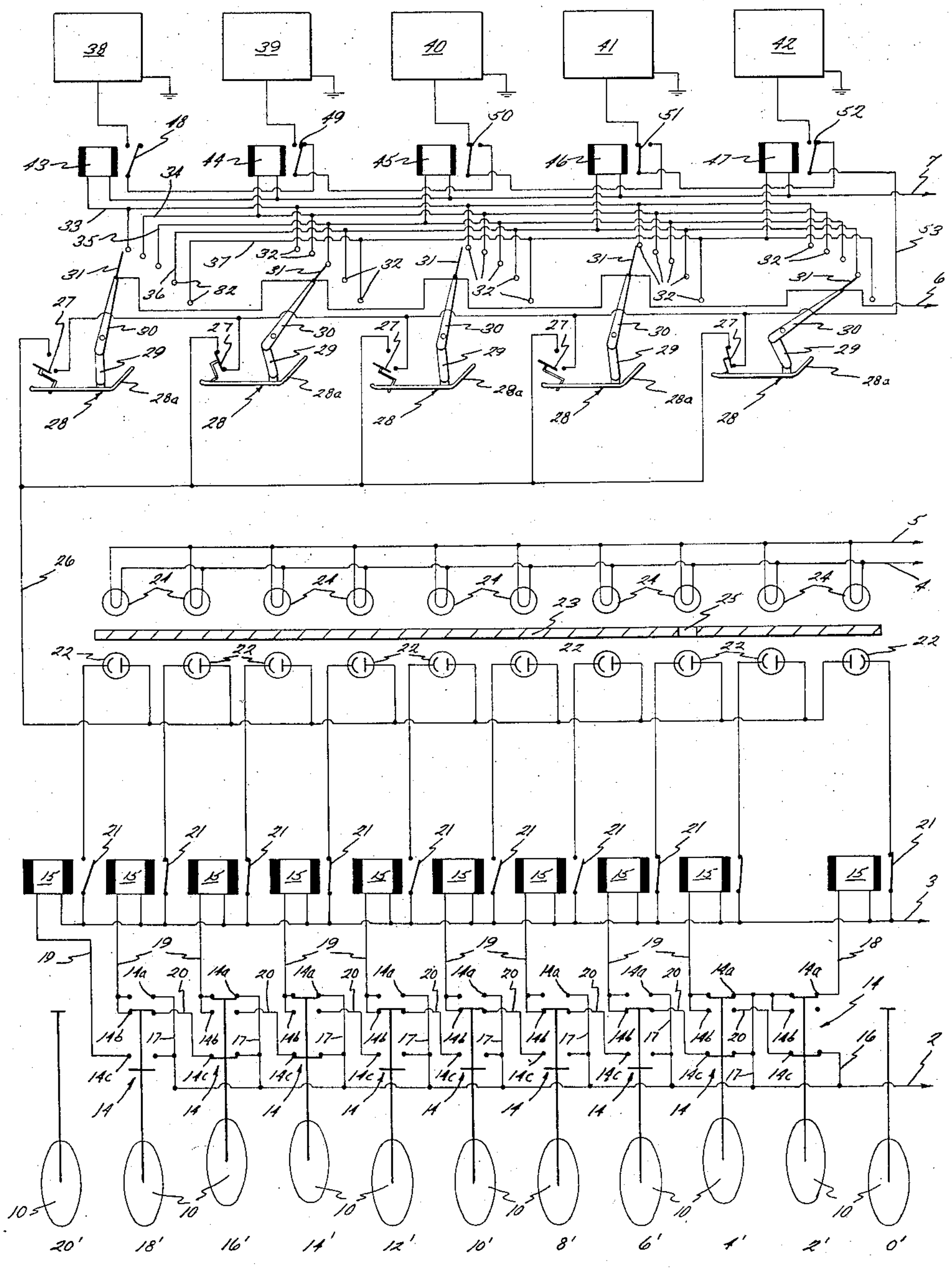
Figure 2 is a diagrammatic illustration of the tally system embodying my invention showing only the essential parts of the system in simple form.
Figure 3:
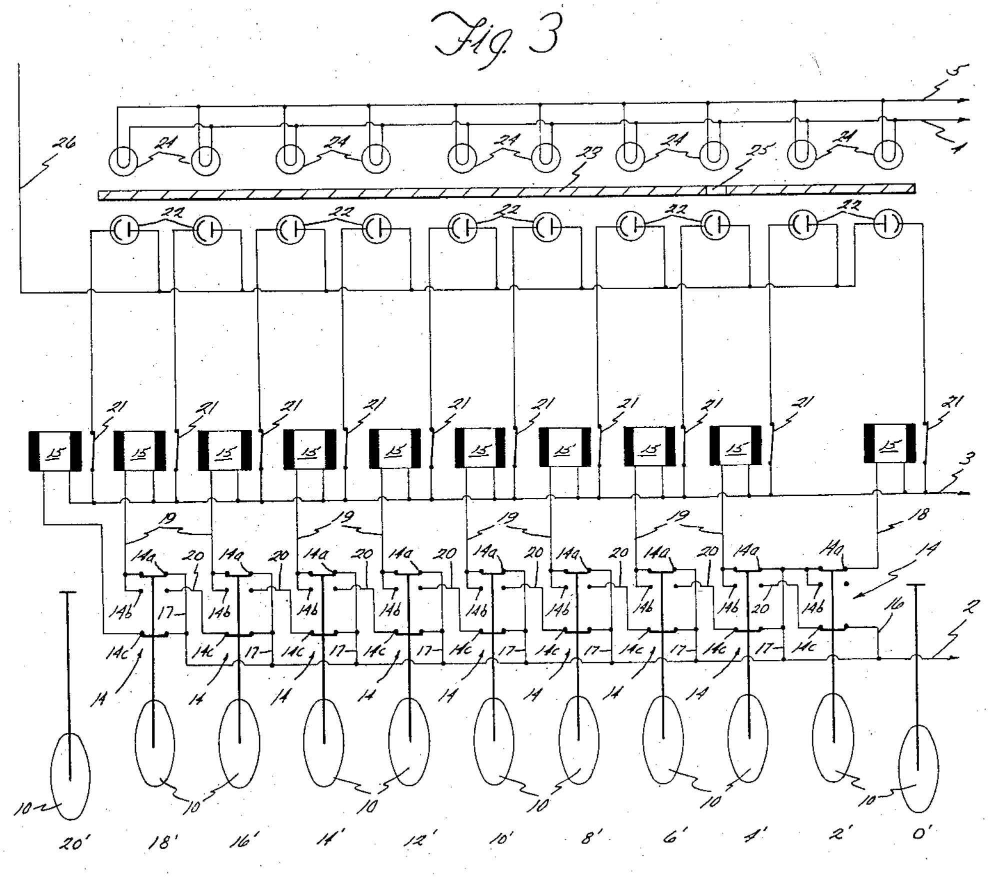
Figure 3 is a diagrammatic view illustrating the length detecting impulse unit detecting a different length than in Figure 2.

The operator lays a board on the conveyor 8, then operates the correct control mechanisms to lift those saws between the end saws, that are necessary to be lifted to clear the good part of a board. The saws remaining down cut the discarded part of the board into two foot lengths of scrap. In Figure 2 the saws 10 at the 2 foot and 4 foot stations are raised to clear 6 feet of board at the end of the board nearest the operator. The zero end saw 10 squares that end of the board. In Figure 2 the saws 10 at the 14 foot and 16 foot stations are also raised to clear 6 feet of board between the 12 foot station and the 18 foot station. The part of the board lying between the six foot station and the 14 foot station is being discarded so the saws at the 6 foot, 8 foot, 10 foot and 12 foot stations remain in down position to cut the discarded board into two foot lengths of scrap that will fall between the several chains of the conveyor 8. These chains are usually two feet apart. The saw at the 18 foot station is shown down in Figure 2 so it will cut off a short two foot long piece at the end of the board most remote from the operator. In Figure 3, all saws 10 between the end saws are raised to trim a 20 foot board.

The saws 10, as shown, are raised by hydraulic jacks 11 which are controlled by solenoid operated valves 12. Thus the control circuit which raises the desired saws actually operates the first detector or length detector of my tally system. The selection by the operator can itself be the first detector or the movement of the saws may be the actual detector that selects the number of impulses to be sent to record the number of two foot lengths that are to be counted. When the tally system is used for counting board feet in a different operation such as a planer operation where the length of each board is already established, then another type of detector may be used, such as a series of photo cells and lamps arranged as in Figure 6, and described more fully hereinafter.

The essential parts of the tally system and its operation will be better understood from the following description of the specific embodiment shown in Figure 2. The saws 10 are shown at the several stations as two feet apart from 0 feet to 20 feet. The end saws 10 are not lifted. They square the ends of all boards engaging them. Each intermediate saw 10 is shown as coupled to a switch 14. The switches 14 control energization of a plurality of relays 15. There is a switch 14 and a relay 15 for each space between the saws 10. In much of the rough sawing of lumber the logs are cut in lengths which are multiples of two feet, that is, 8 feet, 10 feet, 12 feet, etc. So in the following description it will be assumed that each space between the saws is a two foot long space. Thus if two adjacent saws 10 in Figure 2 are raised and the other saws are left down, there will be one board six feet long pass beneath the raised saws and all the rest of the length of the board that was fed to the trim saws will be cut into pieces two feet long and dropped beneath the conveyor 8.

The saws 10 at the two foot and the four foot stations, being lifted, have closed the upper contacts 14*a* and lower contacts 14*c* of their switches 14. This energizes the relay 15 corresponding to the space between the zero station saw and the two foot station saw and the relay 15 corresponding to the space between the two foot station saw and the four foot station saw. Also the relay 15 corresponding to the space between the four foot station saw and the six foot station saw is energized. Current carrying leads 2 and 3 furnish energizing current to these relays. A lead 16 connects the lead 2 to contacts 14*c* of the switch 14 for the space next to the zero station saw 10. Leads 17 connect both contacts 14*a* and 14*c* of the other switches 14 to the lead 2. A lead 18 connects the contact 14*a* of the switch 14 for the space next to the zero station saw 10 to the relay 15 corresponding to this space. Leads 19 connect the contacts 14*a* and 14*b* of the other switches 14 to the relays 15 corresponding to the same spaces. Each of the relays 15 has one terminal connected to the lead 3.

Since lifting of the first saw always allows a board to pass along two of the spaces and each additional adjacent saw that is lifted allows the board to be another space longer, provision must be made whereby closing one switch 14 will effect energizing of the relay for the next adjacent space in one direction, while the switch 14 for that space remains open. To effect this operation it will be noted that in Figure 2, the middle contact 14*b* of each switch is connected to the lower contact 14*c* of the next switch 14 to the right by a lead 20. Thus when the switch 14 corresponding to the four foot saw station is closed, current is supplied to the relays 15 corresponding to both the second space from the right and the third space from the right, the lead 20 bridging the gap from the closed contact 14*c* of the closed switch 14 to the closed contact 14*b* of the adjacent open switch on the left. With this arrangement, lifting of any number of saws 10 between the two end saws will energize the proper relays 15 to represent the lengths of board thus passed through the saws in more than two foot lengths. According to the showing in Figure 2, two six foot lengths of board will pass through the saws. These are the lengths from zero saw station to the six foot saw station and from the twelve foot saw station to the eighteen foot saw station. Two corresponding groups of relays 15 are energized to close their armatures 21.

In order to translate the lengths of the boards into recordable information each relay 15, when energized, connects current to a photo-electric cell 22, there being one cell 22 for each relay 15. These photo-electric cells 22 are arranged in a circular path alongside a rotating disk 23 which is driven in synchronism with the conveyor 8. A series of light sources 24 on the other side of the disk 23 from the cells 22 are energized by current through leads 4 and 5 and provide light to make the cells 22 pass current when an aperture 25 in the disk 23 passes between a cell 22 and a light source 24.

The cells 22 are connected in parallel to a conductor 26 which leads to switches 27 that are mounted on shoes 28. The shoes 28 are supported for movement up and down over the conveyor 8 adjacent to the saws 10. The shoes 28 are arranged in a row transversely of the conveyor 8 so that a board on the conveyor must lift one or more of the shoes. The distance between shoes is dependent upon what lengths of boards may be encountered. They have to be spaced close enough to engage the shortest length of board that may be encountered.

Each of the shoes 28 has an upturned front portion 28*a* which causes the shoe to ride up on a board as the board moves under it. Each shoe carries a link 29 that is connected to a lever 30 which moves a wiping contact 31 over a bank of contacts 32. The contacts 32 are so arranged that for each quarter of inch of board thickness above a predetermined minimum thickness, the wiping contact 31 moves to a new contact 32. The wiping contacts 31 are connected in parallel to a common current supply lead 6. The contacts 32 of each bank are connected to the corresponding thickness indicating contacts of the other banks by common leads 33, 34, 35, 36 and 37. That is, the four quarter thickness indicating contacts 31 of all the banks are connected together so that a board lifting any shoe 28 to the height of one inch (four quarter inches) will connect the current supply lead 6 to the common lead 33. Likewise, if a shoe 28 is lifted by a board to the five quarter height, the wiping contact 31 will engage the right contact 32 to connect the lead 6 to the common lead 34 and so forth. The selection of the lead 33–37 by the thickness of the board selects the desired counter 38, 39, 40, 41 or 42. The manner in which this selection is made is such that only the counter representing the greatest thickness of board passing under the shoes is selected. This eliminates possible false counting by accidental lifting of a shoe by thin scrap.

The connections by which the selected counter is caused to receive the impulses being fed to the lead 26 through the photo-electric cells 22 include relays 43, 44, 45, 46 and 47 which are connected to the common leads 33, 34, 35, 36 and 37 respectively and which have connections to a return lead 7 to the current source. The armatures 48, 49, 50, 51 and 52 of the relays 43, 44, 45, 46 and 47 respectively, have front, normally open contacts, and, rear, normally closed contacts. The armature 48 is connected to the rear contact of the armature 49, the armature 49 to the rear contact of the armature 50 and so on. The armature 52 of the relay 47, which represents the greatest thickness of board being counted, is connected to a lead 53 which is connected in turn to one terminal of each switch 27, the other terminal of each switch 27 being connected to the lead 26. As illustrated in Figure 2, any relay 43–47 when energized, attracts its armature 48–52, opening its rear contact and closing its front contact.

Figure 2 shows relay 46 energized to attract its armature 51, indicating that the highest shoe 28 has established connection, through its wiping contact 31 and one of the stationary contacts of its bank to the common lead 36 from the current supply lead 6. This completes a circuit from the lead 53 through armature 52 and its back contact and armature 51 and its front contact to the counter 41. This connection remains closed until the board moves out from under the shoe.

To register the right number of impulses into the counter 41 to correspond to the width of the board, the board in passing under the shoe closes the limit switch 27 and keeps it closed until the board has passed by the limit switch.

Assuming for example, that the boards are four inch, five inch, six inch, eight inch, etc. widths, each one inch of travel of the conveyor 8 may cause the disk 23 to make one revolution, thus passing the aperture 25 once between each photo-electric cell 22 and its light source 24. If, as in Figure 2, there are six cells 22 connected to the current source lead 3, there will be six impulses of current supplied through the closed switch 27 to the selected counter 41 for each one inch width of the board passing under the closed switch 27.

The counters 38–42 may be any known impulse counter modified to register board feet in response to a given number of impulses. Thus in the example of Figure 2, the six impulses would register 12 feet of length and 7 quarter inches of thickness or a total of 42 pieces, each one inch wide, two feet long and one-fourth inch thick, for each one inch of board width passing under the shoe switch 27. A four inch width of board would thus register as seven board feet on the counter 41. The counter 41 is calibrated in such a fashion that each twenty four impulses that enter it will register as seven board feet. Any suitable impulse counting mechanism can be used. As an example the rotary stop switch shown in U. S. Patent No. 2,559,075, dated July 3, 1955, to Horlacker may be used to receive the impulses and to actuate a counter mechanism once for each twenty four impulses received. The counter mechanism 41 increases its board feet indication a total of seven feet for each twenty four impulses received. The counter 38 would normally count the board feet in the boards of least thickness, which is four-quarters or one inch. Each six impulses to this counter represents one board foot and it increases its board feet indication a total of four board feet for each twenty four impulses fed to it. The counter 39 increases its board feet indication a total of five board feet for each twenty four impulses fed to it, etc.

In many installations the board widths sawed are always in multiples of two inches, that is, four inch, six inch, eight inch, etc. widths with no odd widths of five, seven, nine inches, etc. being sawed. In such an installation the speed of rotation of the disk 23 can be cut in half so it makes one revolution for each two inch advance of the conveyor 8 with a corresponding correction of the counters 38 to 42 so that for each twelve impulses fed to them, they will increase their board feet indications the same amount as they do for twenty four impulses when the disk 23 makes one rotation for each inch of travel of the conveyor 8. In an operation where all of the boards are of the same thickness only one counter need be used and all of the board feet will be registered upon it. The number of counters may be varied to match the several thicknesses of boards to be tallied. Likewise the length detectors may be increased to include greater lengths than the 20 foot maximum indicated by the saws in Figure 2.

Figures 4, 5:
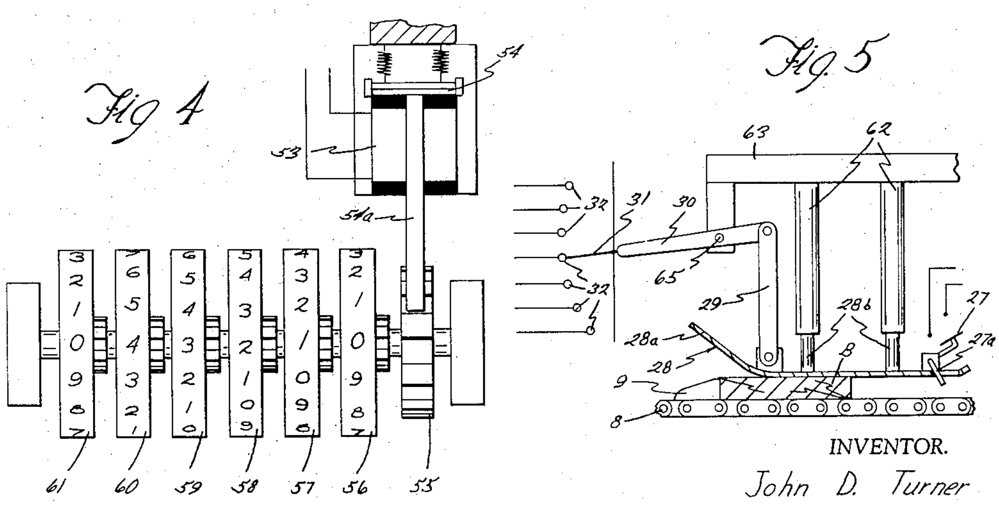
Figure 4 is a somewhat diagrammatic view illustrating an impulse counter serving to record the amount of board feet in boards of one thickness.
Figure 5 is an enlarged view of a width and thickness detecting mechanism utilized in the system embodying my invention.

Referring now to Figure 4, this view illustrates a common type of counter driven by the impulses received when it is selected by the thickness detecting means. A stepping relay 53 has an armature 54 that drives a pawl 54*a* which engages a ratchet wheel 55. The ratchet wheel 55 is so connected to a first counter wheel 56 that each twenty four steps of the ratchet wheel 55 will advance the counter wheel 56 seven tenths of a revolution. The wheel 56 has peripheral digit markers thereon from zero to nine. The counter wheel 56 drives a counter wheel 57 by any well known intermittent step movement such as a pin-tooth wheel drive to turn the counter wheel 57 one-tenth of a revolution for each revolution of the counter wheel 56. A counter wheel 58 is driven in the same way by counter wheel 57. In like manner counter wheels 59, 60, and 61 are driven by the preceding wheel so that board feet up to 999,999 may be counted by the counting device. This counting mechanism is illustrated merely as an example. Any other counting means capable of being actuated by the impulses that flow to the counter may be used.

Referring now to Figure 5, the shoe 28 is a plate having a turned up end 28*a* inclined so as to readily climb a board that is pushed against it. Stems 28*b* guide the plate in its up and down movement. These stems 28*b* are slidable in guide tubes 62 that are carried by a frame element 63 of the trim saw assembly. A pivot pin 65 for a lever 30 that carries the wiper contact 31 is also carried by the frame element 63. The lever 30 is connected by a link 29 to the shoe 28 so that rise and fall of the shoe 28 swings the lever 30 on the pivot pin 65. The switch 27 shown diagrammatically may be any switch having a closing projection 27*a* extending through the shoe 28 to be engaged by a board sliding under the shoe. The projection 27*a* is spaced from the upturned end 28*a* of the shoe 28 so that the shoe is fully raised and resting on the board before the board engages the projection 27*a*. The switch 27, since it moves with the shoe, must have flexible leads connected to its terminals. Installations wherein the boards to be tallied may be in various positions transversely of the conveyor 8, as in connection with a trim saw operation, must have shoes 28 so spaced transversely of the conveyor that they will engage any board that is to be tallied. The shoes 28 may be alongside the trim saws as indicated in Figure 1, or elsewhere above the conveyor so long as they are so positioned that the length detection of each board is made near enough in time to the thickness and width detections as to insure that the impulses depicting the length of a board will be transmitted while the board is passing under the shoe 28. In practical operation of trim saws the length selection is made by the operator before the board reaches the saws so the shoes may be engaged by the board any time after the selection of the board until the trim saws have cut through the board. A board may have a thin section, which is to be cut out, engage a shoe 28 and lift it less than the full thickness of the part of the board to be tallied, which lifts another shoe 28 the full thickness of the board without making any error in the tally because the shoe that is lifted the highest automatically prevents shoes lifted a less amount from completing circuit to a counter. The armatures 48–52 accomplish this result.

Figure 6:
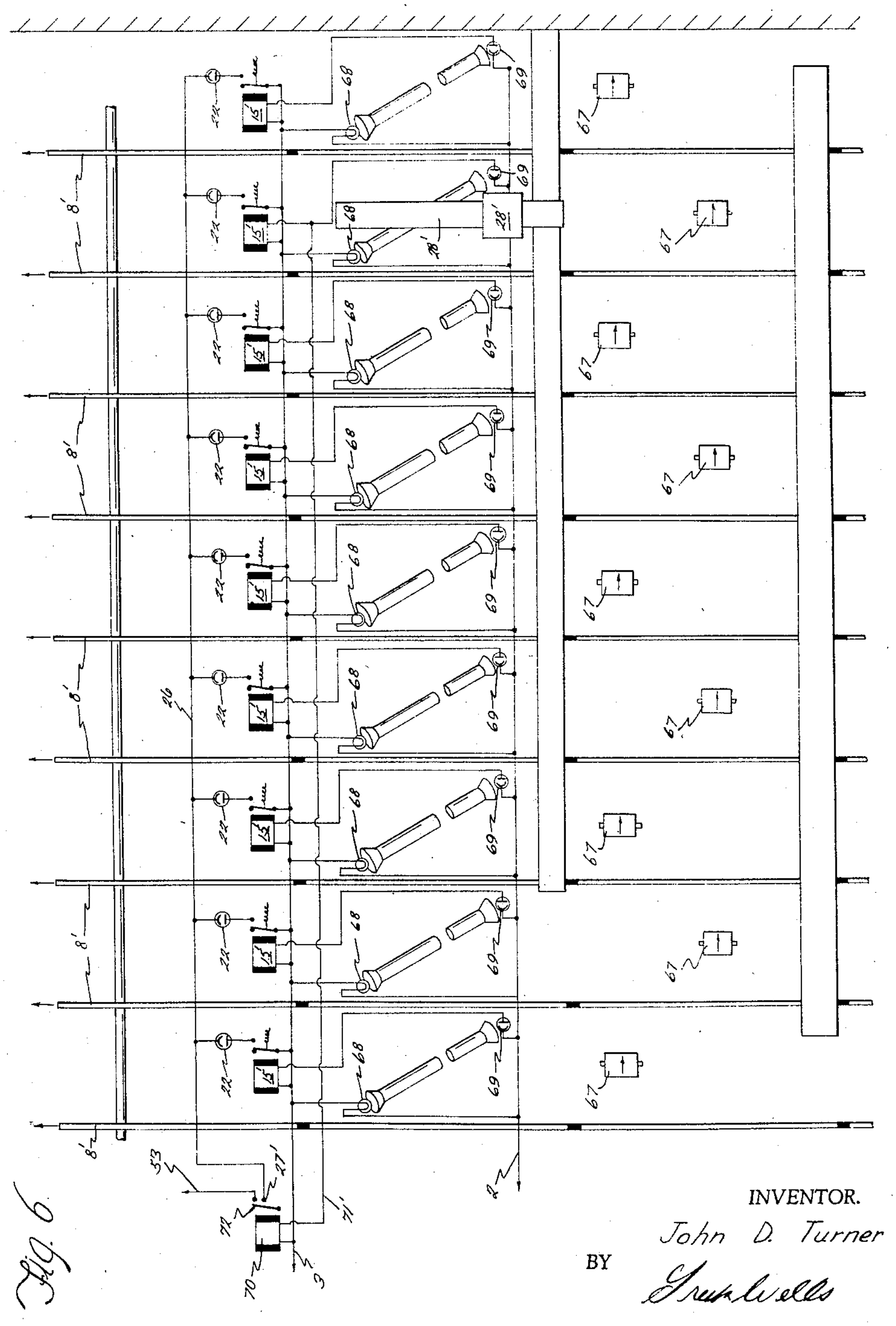
Figure 6 is a diagrammatic view illustrating a detecting means useful apart from trim saws to tally lumber.

In Figure 6 there is illustrated another type of length detection which may replace the trim saw detection where the boards are already at the desired length. In this figure the boards are carried by a conveyor 8′ which is preferably of the same general construction as the conveyor 8. However, this conveyor 8′ has means such as the end rollers 67 that move the boards as they are advanced so that all boards have one end aligned. The length detection then is by a series of light source, photo-electric cell circuits which actuate relays 15′ which replace relays 15 in the detecting and impulse transmitting circuit shown in Figure 2. In this modification, each light source 68 photo-electric cell 69 unit represents a two foot length of board so that when a board blocks passage of light through a unit, the corresponding relay 15′ is de-energized to complete a counting circuit. Note that in this circuit the relays 15′ are normally energized to hold the counting circuit open. In this modification also one of the light source photo-electric cell units serves to close the width circuit control switch 27′ as well as to energize a length indicating relay 15′. In this way, simultaneous with the board indication the width detecting switch 27′ is closed by its associated normally energized relay 70, being de-energized when light is cut off from the cell 69. A lead 71 connects the second cell 69 from the right end of Figure 6 to the relay 70 and a connection from the current supply lead 3 to the relay 70 provides an energizing circuit for relay 70 to keep its armature 72 normally in position to open switch 27′. The lamps 68 are connected across current supply leads 2 and 3.

The shoe 28′ is constructed the same as the shoe 28 except for the removal of the switch 27 which is not needed. The connections from the shoe 28′ through the wiper contacts 31 and bank contacts 32 to the counter selecting circuits and current supply lead 6 remain the same as with the shoe 28. The shoe 28′ is so positioned with respect to the units 68—69 that a board raises the shoe 28′ before it cuts off light from the cells 69 and keeps the shoe 28′ raised until the board again lets light reach the cells 69. Where all of the boards to be tallied are of the same thickness only one counter is needed and the shoe to counter circuits may be eliminated, the lead 53 being directly connected to the counter.

It is believed that the nature and advantages of my invention will be understood from the foregoing description. With the system described, boards passing a given point may be caused to generate impulses indicating one dimension, which impulses can then be multiplied according to a second dimension of the board and registered upon a counter which tallies the number of board units of the size into which any board to be tallied can be divided evenly and which is calibrated to indicate the total board feet these units add up to. Hereinbefore these board units have been described as pieces two feet long, one inch wide, and one-fourth inch thick. If boards are cut in odd as well as even footage lengths then the units would have to be half as long. The system, however, would operate just as well with the smaller unit board size by increasing the impulses generated accordingly.

Having thus described my invention, I claim:

1. A device for tallying the board feet in a series of boards of lumber, while they are moved by a conveyor along a definite path, comprising a board length detector, a board width detector, a board thickness detector, an electrical impulse creator operatively connected to one of said detectors operable to create an impulse for each increment of the dimension detected thereby which is the largest increment of that dimension common to all boards being tallied, an impulse multiplier operatively connected to a second detector and to the conveyor to transmit all of the impulses so created once for each increment of the dimension detected by said second detector, which is the largest increment of that dimension common to all boards being tallied, a plurality of impulse counters, a counter directing device operatively connected to the third detector to direct the transmitted impulses to one or another of said impulse counters, according to the particular dimension detected by the third detector and said impulse counters each being calibrated to indicate in additional board feet the number of impulses transmitted to it.

2. A device for tallying the board feet in a series of boards of lumber, while they are moved by a conveyor along a definite path, comprising a board length detector, a board width detector, a board thickness detector, an electrical impulse creator operatively connected to one of said detectors operable to create an impulse for each increment of the dimension detected thereby which is the largest increment of that dimension common to all boards being tallied, an impulse multiplier operatively connected to a second detector and to the conveyor to transmit all of the impulses so created once for each increment of the dimension detected by said second detector, which is the largest increment of that dimension common to all boards being tallied, an impulse counter for each increment of the third dimension detectable by said third detector and means actuated by the third detector to direct the transmitted impulses to the counter selected.

3. A device for tallying the board feet in a series of boards of lumber, while they are moved by a conveyor along a definite path, comprising a board length detector, a board width detector, a board thickness detector, an electrical impulse creator operatively connected to one of said detectors operable to create an impulse for each increment of the dimension detected thereby which is the largest increment of that dimension common to all boards being tallied, an impulse multiplier operatively connected to a second detector and to the conveyor to transmit all of the impulses so created once for each increment of the dimension detected by said second detector, which is the largest increment of that dimension common to all boards being tallied, and means controlled by said third detector for counting the said impulses.

4. A device for tallying the board feet in a series of boards of lumber, while they are moved by a conveyor along a definite path, comprising a board length detector, a board width detector, an electrical impulse creator operatively connected to one of said detectors operable to create an impulse for each increment of the dimension detected thereby which is the largest increment of that dimension common to all boards being tallied, an impulse multiplier operatively connected to a second detector and to the conveyor to transmit all of the impulses so created once for each increment of the dimension detected by said second detector, which is the largest increment of that dimension common to all boards being tallied, and a counter receiving said impulses operable to register in board feet the amount of lumber in boards of a given thickness having the widths and length detected.

5. The device defined in claim 4 wherein the board length detector comprises trim saws which cut the boards to the desired length and switches controlled by said trim saws.

6. The device defined in claim 4 wherein the board length detector comprises spaced photo-electric cell-light source units, one at each two feet of space across the conveyor.

7. The device defined in claim 4 wherein the board length detector comprises spaced photo-electric cell-light source units, one at each two feet of space across the conveyor and the width detector comprises one of said units.

8. The device defined in claim 4 wherein the board width detector comprises a shoe positioned in the path of boards carried by said conveyor so as to be raised by a board and a switch closing element carried by said shoe and movable to switch closing position by a board passing under the shoe.

9. A device for tallying the board feet in a series of boards of lumber, while they are moved by a conveyor along a definite path in a direction transverse to the length of the boards, comprising a series of length determining elements spaced apart across the conveyor at spacings corresponding to the smallest difference in length between boards, means effective upon passage of a board across said elements to close an electrical circuit for each of the elements across which the board passes whereby the number or circuits closed by the passing of a board indicates the length of the board, means synchronized with said conveyor cooperating with said closed circuits to create electrical impulses for said closed circuits in succession, an impulse transmitting circuit receiving said impulses from said last named means, impulse counting means for receiving impulses from said transmitting circuit, a switch in said transmitting circuit, and means actuated by a board passing said elements to keep said switch closed for a time depending upon the width of the board.

10. The device defined in claim 9 wherein the impulse counting means embodies an impulse counter for each thickness of board conveyed and means operable by a board as it approaches position to close said switch to select the counter corresponding to the thickness of that board.

References Cited in the file of this patent

UNITED STATES PATENTS

| | | |
|---|---|---|
| 789,989 | Meyer | May 16, 1905 |
| 2,048,192 | Marston | July 21, 1936 |
| 2,656,105 | Terrill | Oct. 20, 1953 |
| 2,689,082 | Kolisch | Sept. 14, 1954 |
| 2,691,486 | Work | Oct. 12, 1954 |
| 2,727,391 | Kolisch | Dec. 20, 1955 |